Patented Jan. 12, 1932

1,840,989

UNITED STATES PATENT OFFICE

WILLIAM N. TRAYLOR, OF KENVIL, NEW JERSEY, ASSIGNOR TO HERCULES POWDER COMPANY, OF WILMINGTON, DELAWARE, A CORPORATION OF DELAWARE

IMPREGNATING COMPOUND

No Drawing.  Application filed August 24, 1929.  Serial No. 388,273.

My invention relates to an improvement in impregnating compound more particularly for the impregnation of absorptive materials for use in various arts.

In accordance with my invention, I produce a new compound and one which is of special advantage for use in impregnating felt, canvas, paper, or other absorptive material for use in various arts such as, for example, in the production of box toes for shoes. The novel compound in accordance with my invention possesses numerous distinct advantages over compounds heretofore used for impregnating purposes. For example, my improved compound possesses greater strength and pliability, it is possessed of desired tackiness, is odorless, will not dust out, will not fade or sweat, has a wider range of mixing ingredients and material into which it is impregnated will retain its shape under varied climatic temperatures.

The novel compound in accordance with my invention consists essentially in a compound of rubber and resin formed by fusing. The compound in addition to rubber and a resin may contain a plasticizer.

The novel compound in accordance with my invention may include in addition to rubber a resin, such, for example, as wood or gum rosin, sandarac, pale manila copal, and the like, and if a plasticizer is included, such may be, for example, pine oil foots, a drying oil as linseed oil, China-wood oil, and the like, a non-drying oil as paraffin oil, cotton seed oil and the like, or other suitable plasticizers, as polyterpenes, ethyl abietate, etc.

The novel compound in accordance with my invention may contain rubber within the range 1%–50% and rosin within the range 50%–99%. Where a plasticizer is included, such may be included in amount within the range of about 1%–25%. For the production of the compound the ingredients, as rubber and another resin, are fused together at a suitable temperature, say within the range 350° F.–650° F.

As a specific illustration of the novel compound in accordance with my invention, for example, 20 parts of rubber and 80 parts of rosin are fused together at a temperature within about the range 450° F.–600° F. Alternatively, the rubber may be initially melted by heating to a temperature within about the range 450° F.–600° F. and rosin either cold or in a heated state added, the temperature being maintained until the ingredients are desirably fused together, or the rosin may be melted and the rubber added with heating to the desired temperature.

As a further illustration of the novel compound in accordance with my invention, for example, 23 parts of rubber are melted at 550° F.–600° F. and to the melted rubber is added 68 parts of rosin and 9 parts of pine oil foots, the latter acting as a plasticizer, and the temperature maintained until the several ingredients are fused together. The pine oil foots and rosin may be added to the melted rubber either in heated condition or cold.

In the production of the novel compound in accordance with my invention, with the use of a resin other than rosin, as for example, sandarac, pale manila copal, etc., the procedure will be the same as when using rosin, that is, the rubber and resin used will be fused together in suitable proportions with or without the addition of a plasticizer, depending upon whether such is desired.

In the production of the compound in accordance with my invention, it will be understood that the rubber may be vulcanized, unvulcanized, or reclaimed, gutta percha, etc.

It will be understood that the novel compound in accordance with my invention may be advantageously used for the impregnation of various materials for various purposes, where its novel and desirable characteristics will be advantageous.

What I claim and desire to protect by Letters Patent is:—

1. An impregnating compound including rubber and rosin fused together and pine oil foots.

2. An impregnating compound including rubber and wood rosin fused together and pine oil foots.

In testimony of which invention, I have hereunto set my hand, at Kenvil, New Jersey, on this 21st day of August, 1929.

WILLIAM N. TRAYLOR.